W. Crompton.
Loom Shedding.

No. 247.

Reissued Sept. 13, 1853.

N. PETERS, PHOTO-LITHOGRAPHER, WASHINGTON, D. C.

UNITED STATES PATENT OFFICE.

M. A. FURBUSH AND G. CROMPTON, OF WORCESTER, MASSACHUSETTS.
ASSIGNEES OF WILLIAM CROMPTON.

IMPROVEMENT IN FIGURE POWER-LOOMS.

Specification forming part of Letters Patent No. 491, dated November 25, 1837; extended April 9, 1851;
Reissue No. 247, dated September 13, 1853.

*To all whom it may concern:*

Be it known that I, WILLIAM CROMPTON, of Taunton, in the county of Bristol and State of Massachusetts, have invented certain Improvements in the Figure or Fancy Power-Loom, by means of which improvement the power of extending and varying the figure is greatly increased, while the required changes therein are much facilitated; and I do hereby declare the following is a full and exact description thereof.

Figure 1:
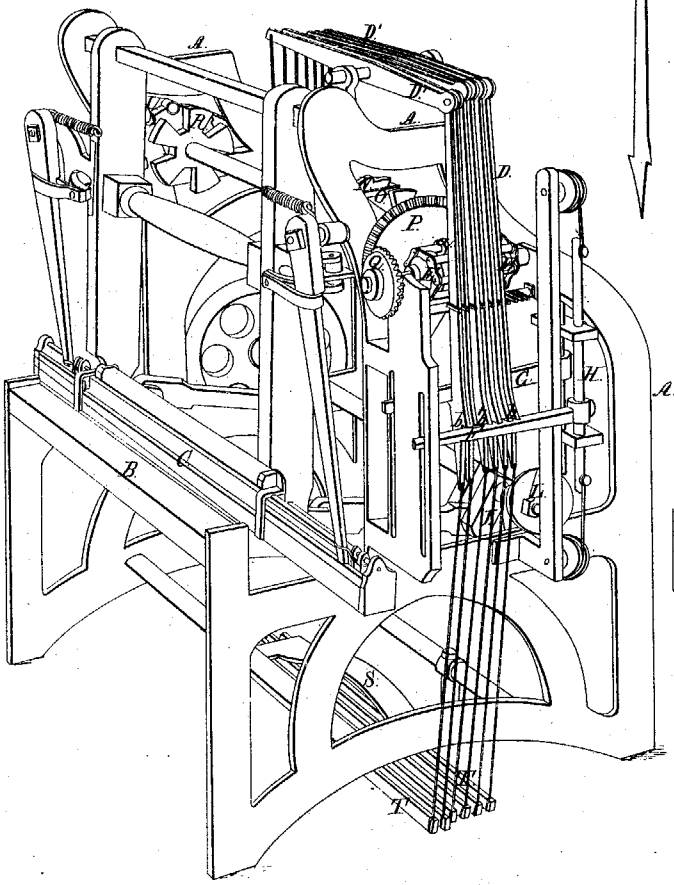

Figure 1 is a perspective view of the whole machine, A A being the frame, B the breast-beam, and C the lathe, together with which other parts of the machine are represented which do not need description, not being new.

D D are the jacks which operate the harness, of which, with their corresponding levers D D, there may be any desired number. It is obvious that other means may be resorted to for connecting the jacks with the harness without changing the principle of operation or construction.

Figure 2:
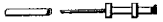

E E is the apparatus by which the jacks are thrown out. In the drawings it is represented as in the form of a cylinder consisting of six bolts or rods running from end to end, and having on them shifting-rollers which project from them and come into contact with the jacks, throwing them out as required by the pattern. One of these shifting-rollers is seen at A. Fig. 2 shows one of the bolts or rods, with the rollers on it at A A, being the rollers which are slid on the bolts and are retained in their places by tubes placed between them, which also slide onto the bolts, and are made of such lengths as are required to keep them in their proper places when a larger number of changes are required than can be obtained from placing the bolts, with their rollers, around a single cylinder. They are so arranged as to form an endless chain of belts and rollers, which pass round a cylinder situated like that represented, and also round another placed below it or otherwise conveniently situated. This apparatus is for the purpose of controlling the position of the jacks in such a manner that they shall be carried up or down by the lifter and depressor, giving such motion to the harness as the figure may require.

The modes above described of constructing and arranging the details of this figuring apparatus I much prefer; but it is obvious that mere pins or projections at the points where the rollers are placed, whether on rods or on the surface of a cylinder, or on almost any kind of an endless chain arranged to move, as above described, will answer the purpose, though in an inferior manner without varying the principle of operation. It will be also seen that this figuring cylinder or chain may with equal convenience be placed in front of the jacks. It is represented as placed behind them. The only office performed by the rollers on the chain is the throwing out of the jacks, the lifting and depressing being effected by an apparatus for that especial purpose, to be now described.

F is a lifter which extends across the jacks D D, and catches under the offsets or projections *b b* upon them when they are thrown out, and as it rises raises them and operates the harness.

G is a depressor attached to slide rod K′, for carrying those jacks down which are not raised by the lifter F.

Figure 3:
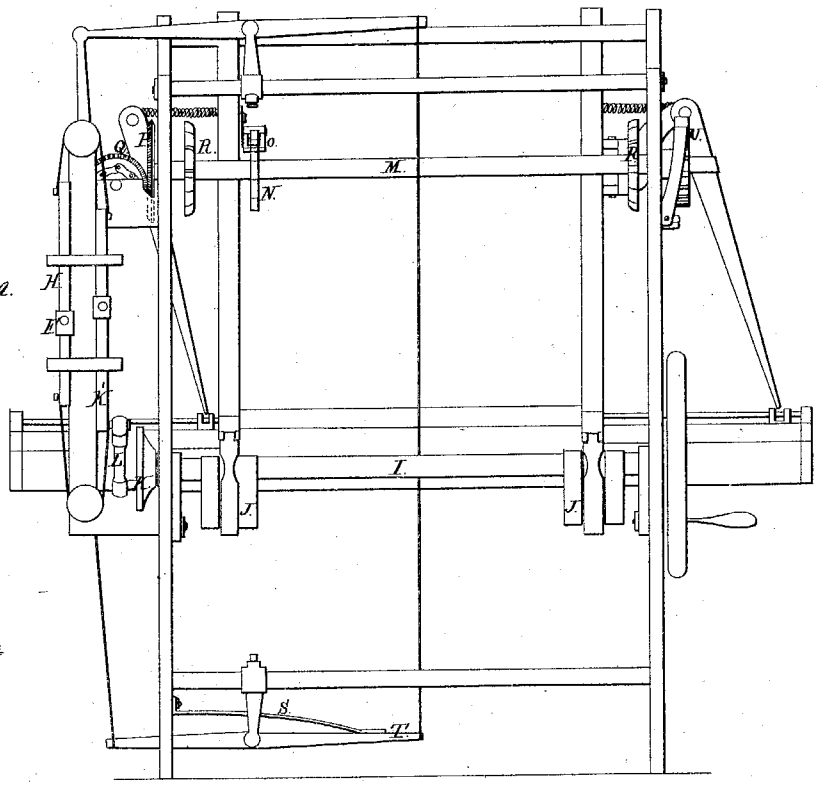

H is a sliding rod, to which the lifter F is attached, the operation of which will be best seen in Fig. 3, which is a back view of the loom. In this figure, I is the driving shaft, the cranks J J of which work the lathe.

K is a crank for working the lifter and depressor of the jacks. This crank is connected to the slide-rod K′ by means of the shackle-bar L, which it raises and lowers as it does also the sliding rod H, carrying the lifter F and the depressor G in opposite directions, there being two pulleys to communicate motion from one to the other, as seen in the drawings. The axis of the crank K may be made adjustable.

The modes of elevating and depressing the lifter and depressor which I have described I prefer to all others; but they may be differently operated as every skillful mechanic can readily see. Instead of being connected with a sliding rod at one end they may be each connected with such a rod at both ends. They may also be connected by arms to a rock-shaft and vibrate in the arc of a circle, or they may be placed like lays on the the surface of a vibrating or rotating cylinder, or they may be connected at their ends or at one end to a disk or disks on a shaft which vibrates or rotates upon its axis, or they may vibrate in a plane on a center at one end thereof; but so long as the lifter and depressor rise and sink simultaneously in such lines as to take hold of the hooks or projections on the jacks and elevate and depress them the true and essential principle of my invention is preserved. The lifter and depressor are so arranged relatively to the hooks or projections on the jacks as to give less motion to the heddles in proportion to their proximity to the felt or cloth making line. This is effected by giving a slight inclination to that edge of the lifter and depressor which operates against the hooks, so that the motion of the jacks shall be less and less from back to front, and hence a corresponding motion in the heddles from back to front. It is readily seen the same effect would be produced by slightly inclining the line of the series of hooks with or without an inclination of the lifter and depressor. The object of this arrangement is to place all the upper warps, when the shed is fully opened, in the same plane, and also those of the lower warps in another plane, which is a matter of great moment in figured looms where many numbers of heddles are required.

Figure 4:
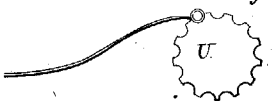
Figure 5:
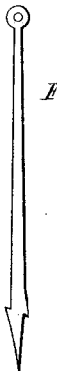

The shaft M regulates the action of the shuttle and also that of the apparatus which throws out the jacks. N is a ratchet-wheel placed upon this shaft, and O is a draw-catch which is jointed onto the upper end of the lathe, and as this is made to vibrate by the cranks J J the catch takes a new tooth on the ratchet-wheel at each revolution of the crank-shaft and carries the shaft M to the required distance. The bevel-wheel P, Fig. 1, is on the end of this shaft, and into this gears the small bevel-wheel Q upon the shaft of the roller-cylinder, and it may be seen, therefore, that this cylinder may have the proper motion communicated to it at every beat of the lathe. The spring S, which presses upon the lower levers, T T, serves to bring them regularly into place. On the end of the shaft M there is a check-wheel, U, having as many depressions upon its periphery as there are teeth in the ratchet-wheel, into which depressions the curved end of a spring passes to hold the shaft and chain-cylinder steady during the intervals of motion. Fig. 4 is one end view of this check-wheel and spring, and Fig. 5 one of the jacks, with its offsets for lifting and depressing.

The position I give the jacks I consider the best, but it is plain they may be placed in other positions without changing the principle of my invention.

The two notched wheels R R on the shaft M are for working the pick and throwing the shuttle as the lathe vibrates. The projecting part of one of these wheels comes into contact with a bell-crank, which throws the pick as in some other looms, while at the opposite end one of the notches clears the crank, and so on alternately.

Having fully described my invention and the modes of carrying it into effect, what I claim therein as new, and desire to secure by Letters Patent, is—

1. The jacks with hooks or projections thereon capable of being taken or passed by the lifter and depressor, as required, in combination with the harness or heddles, for the purpose of opening the shed.

2. The combination of the jacks, constructed and arranged substantially as described, with the lifter and depressor, as described.

3. The combination of the pattern chain or cylinder with the jacks constructed in the manner described.

4. Arranging and connecting the lifter and depressor, which operates the jacks in such a manner that they shall operate simultaneously to elevate and depress the jacks and warps in forming the shed, substantially as described.

5. Giving motion to the pattern-chain or cylinder, substantially as described.

6. The combination of the pattern-chain or cylinder with the jack's lifter and depressor, as described.

7. So constructing or arranging the lifter and depressor and the hooks or projections on the jacks with reference to each other, substantially as set forth, as to bring the upper warps all into the same plane and the lower warp all into another, when the shed is opened. I do not claim, broadly, the bringing of the wraps into said planes.

8. Connecting the hook-jacks to the bottom treadles or levers by inclined wires or their equivalents, to hold the jacks against the tnbes or bars of the pattern-cylinder or chain when not thrown out by the rollers or other projections thereon.

WILLIAM CROMPTON.
MERRITT A. FURBUSH.
GEORGE CROMPTON.

Witnesses:
VIRGIL CORNISH,
WILLIAM PORTER.
EDSON J. FESSENEEN,
*Conservator to William Crompton.*

Witnesses to M. A. F. and G. C.:
CHARLES H. HILL,
JNO. B. D. COGSWELL.